United States Patent
Tanaka

(10) Patent No.: US 9,383,383 B2
(45) Date of Patent: Jul. 5, 2016

(54) PHYSICAL QUANTITY SENSOR, MANUFACTURING METHOD THEREOF, AND ELECTRONIC APPARATUS

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 528 days.

(21) Appl. No.: 13/858,284

(22) Filed: Apr. 8, 2013

(65) Prior Publication Data

US 2014/0069190 A1   Mar. 13, 2014

(30) Foreign Application Priority Data

Apr. 10, 2012 (JP) ................. 2012-089275

(51) Int. Cl.
*G01P 15/125* (2006.01)
*G01P 15/08* (2006.01)

(52) U.S. Cl.
CPC ........... *G01P 15/125* (2013.01); *G01P 15/0802* (2013.01); *G01P 2015/0871* (2013.01); *Y10T 156/10* (2015.01)

(58) Field of Classification Search
CPC .......... G01P 15/125; G01P 2015/0831; G01P 2015/0871
USPC ...................................... 73/514.32
See application file for complete search history.

(56) References Cited

U.S. PATENT DOCUMENTS

| 5,054,320 | A  | * | 10/1991 | Yvon ........................ 73/514.18 |
|---|---|---|---|---|
| 5,488,864 | A  |   | 2/1996  | Stephan |
| 7,578,190 | B2 |   | 8/2009  | Lin et al. |
| 2002/0051258 | A1 |   | 5/2002 | Tamura |
| 2007/0220973 | A1 |   | 9/2007 | Acar |
| 2009/0031809 | A1 |   | 2/2009 | Lin et al. |
| 2009/0107238 | A1 | * | 4/2009 | Guo ........................ 73/514.32 |
| 2012/0227494 | A1 | * | 9/2012 | Yosida et al. ............ 73/514.32 |

FOREIGN PATENT DOCUMENTS

| DE | 10 2008 042 357 | 4/2010 |
|---|---|---|
| EP | 1 947 053 | 7/2008 |
| EP | 2 053 412 | 4/2009 |
| JP | 10-206458 | 8/1998 |
| JP | 2002-005950 A | 1/2002 |
| WO | WO-2008-093693 A1 | 8/2008 |

* cited by examiner

*Primary Examiner* — John Chapman, Jr.
(74) *Attorney, Agent, or Firm* — Harness, Dickey & Pierce, P.L.C.

(57) ABSTRACT

A physical quantity sensor includes: a substrate; a first movable body that is provided on the substrate and includes first movable electrode sections; first fixed electrode sections disposed on the substrate so as to face the first movable electrode sections; a second movable body that is provided on the substrate and includes second movable electrode sections; and second fixed electrode sections disposed on the substrate so as to face the second movable electrode sections. A post section protruding from the principal surface of the substrate is provided in a portion of the substrate located between the first and second movable bodies in plan view.

9 Claims, 13 Drawing Sheets

PHYSICAL QUANTITY SENSOR, MANUFACTURING METHOD THEREOF, AND ELECTRONIC APPARATUS

BACKGROUND

1. Technical Field

The present invention relates to a physical quantity sensor, a manufacturing method thereof, and an electronic apparatus.

2. Related Art

In recent years, a physical quantity sensor using a silicon MEMS (Micro Electro Mechanical System) technique, for example, has been developed.

The physical quantity sensor includes a support substrate, a fixed electrode fixed to the support substrate, and a movable body having a movable electrode disposed so as to face the fixed electrode with a gap therebetween, for example, and detects a physical quantity, such as acceleration, on the basis of the capacitance between the fixed electrode and the movable electrode.

The movable body is formed, for example, by forming a recess on the support substrate that is a glass substrate, bonding a silicon substrate to the support substrate, and processing the silicon substrate. The movable body is spaced apart from the support substrate since the movable body is disposed on the recess, for example, and can be displaced according to the physical quantity. The glass substrate and the silicon substrate are bonded to each other by anodic bonding as disclosed in JP-A-10-206458, for example.

However, for example, when bonding the support substrate and the silicon substrate, which becomes a movable body, to each other by anodic bonding as described above, there has been a case where the silicon substrate is pulled to the support substrate side and sticks to the support substrate (more specifically, to the bottom surface of the recess). In particular, when two movable bodies are disposed on the recess, the area of the recess is increased, and the silicon substrate is further pulled to the support substrate side. As a result, there has been a case where the yield is reduced.

SUMMARY

An advantage of some aspects of the invention is to provide a physical quantity sensor that can be manufactured with a high yield. Another advantage of some aspects of the invention is to provide a method of manufacturing the above-described physical quantity sensor. Still another advantage of some aspects of the invention is to provide an electronic apparatus including the above-described physical quantity sensor.

The invention can be implemented as the following forms or application examples.

APPLICATION EXAMPLE 1

This application example is directed to a physical quantity sensor including: a substrate having a principal surface; a first movable body that is provided above the principal surface of the substrate and includes a first movable electrode section; a first fixed electrode section disposed on the principal surface of the substrate so as to face the first movable electrode section; a second movable body that is provided above the principal surface of the substrate and includes a second movable electrode section; and a second fixed electrode section disposed on the principal surface of the substrate so as to face the second movable electrode section, wherein, in the substrate, a post section protruding from the principal surface of the substrate is provided between the first and second movable bodies in plan view.

According to such a physical quantity sensor, when bonding the substrate and the silicon substrate, which becomes the first and second movable bodies, to each other by anodic bonding, for example, it is possible to suppress the occurrence of a situation where the silicon substrate is pulled to the substrate side and sticks to the substrate. As a result, such a physical quantity sensor can be manufactured with a high yield.

APPLICATION EXAMPLE 2

This application example is directed to the physical quantity sensor according to the application example described above, wherein a recess having a side wall and an inner bottom are provided in the substrate, and the principal surface may be located at the inner bottom of the recess.

Such a physical quantity sensor can be manufactured with a high yield.

APPLICATION EXAMPLE 3

This application example is directed to the physical quantity sensor according to the application example described above, wherein a height of the post section is the same as a height of the side wall of the recess.

According to such a physical quantity sensor, when bonding the substrate and the silicon substrate, which becomes the first and second movable bodies, to each other by anodic bonding, for example, it is possible to more reliably suppress the occurrence of a situation where the silicon substrate is pulled to the substrate side.

APPLICATION EXAMPLE 4

This application example is directed to the physical quantity sensor according to the application example described above, wherein the post section is provided integrally with the side wall of the recess. In addition, when the recess is divided into first and second recesses with the post section as a boundary, the first movable body is provided on the first recess and the second movable body is provided on the second recess.

According to such a physical quantity sensor, the first recess may be provided below the first movable body and the second recess may be provided below the second movable body by providing the post section. In this case, air can be confined in the first and second recesses compared with a structure without a post section. As a result, it is possible to improve the damping (viscosity) effect. Specifically, when there is no post section, it is not possible to confine air. In this case, there is a disadvantage in that the movable body comes in contact with a glass substrate easily when excessive acceleration is applied. However, by providing the post section, it is possible to confine air in the first and second recesses. As a result, since the damping effect is further increased, it is difficult for the movable body to come in contact with the glass substrate.

APPLICATION EXAMPLE 5

This application example is directed to the physical quantity sensor according to the application example described above, wherein the physical quantity sensor further includes a lid that is placed on the substrate and covers the first and second movable bodies, and the lid is bonded to the post section.

According to such a physical quantity sensor, the lid can have high rigidity.

APPLICATION EXAMPLE 6

This application example is directed to the physical quantity sensor according to the application example described above, which further includes a stopper section that is bonded to the post section and is disposed so as to face at least one of the first and second movable bodies.

According to such a physical quantity sensor, it is possible to suppress the occurrence of a situation where the first movable electrode section and the first fixed electrode section stick to each other. Alternatively, it is possible to suppress the occurrence of a situation where the second movable electrode section and the second fixed electrode section stick to each other.

APPLICATION EXAMPLE 7

This application example is directed to the physical quantity sensor according to the application example described above, wherein a material of the substrate is glass, and a material of each of the first and second movable bodies is silicon.

According to such a physical quantity sensor, the first and second movable bodies can be formed by processing the silicon substrate, and the silicon substrate for forming the first and second movable bodies and the substrate can be bonded to each other by anodic bonding.

APPLICATION EXAMPLE 8

This application example is directed to a method of manufacturing a physical quantity sensor including: preparing a first substrate in which a recess and a post section protruding from a bottom surface of the recess are provided; bonding a second substrate on the post section and a side wall of the recess of the first substrate; and processing the second substrate to form a first movable body on one side and a second movable body on the other side with the post section as a boundary in plan view.

According to such a method of manufacturing a physical quantity sensor, when bonding the first and second substrates to each other by anodic bonding, for example, it is possible to suppress the occurrence of a situation where the second substrate is pulled to the first substrate side and sticks to the first substrate. As a result, it is possible to obtain the physical quantity sensor that can be manufactured with a high yield.

APPLICATION EXAMPLE 9

This application example is directed to the method of manufacturing a physical quantity sensor according to the application example described above, which further includes forming a first fixed electrode section at a position on the substrate facing the first movable body and forming a second fixed electrode section at a position on the substrate facing the second movable body.

According to such a method of manufacturing a physical quantity sensor, it is possible to obtain the physical quantity sensor that can be manufactured with a high yield.

APPLICATION EXAMPLE 10

This application example is directed to an electronic apparatus including the physical quantity sensor according to the application example described above.

Since such an electronic apparatus includes the physical quantity sensor according to the above application example, it is possible to realize a high yield.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. In addition, the embodiments described below are not intended to limit the contents of the invention defined by the appended claims. In addition, all of the configurations described below are not necessarily essential components of the invention.

1. First Embodiment 1.1. Physical Quantity Sensor

Figure 1:
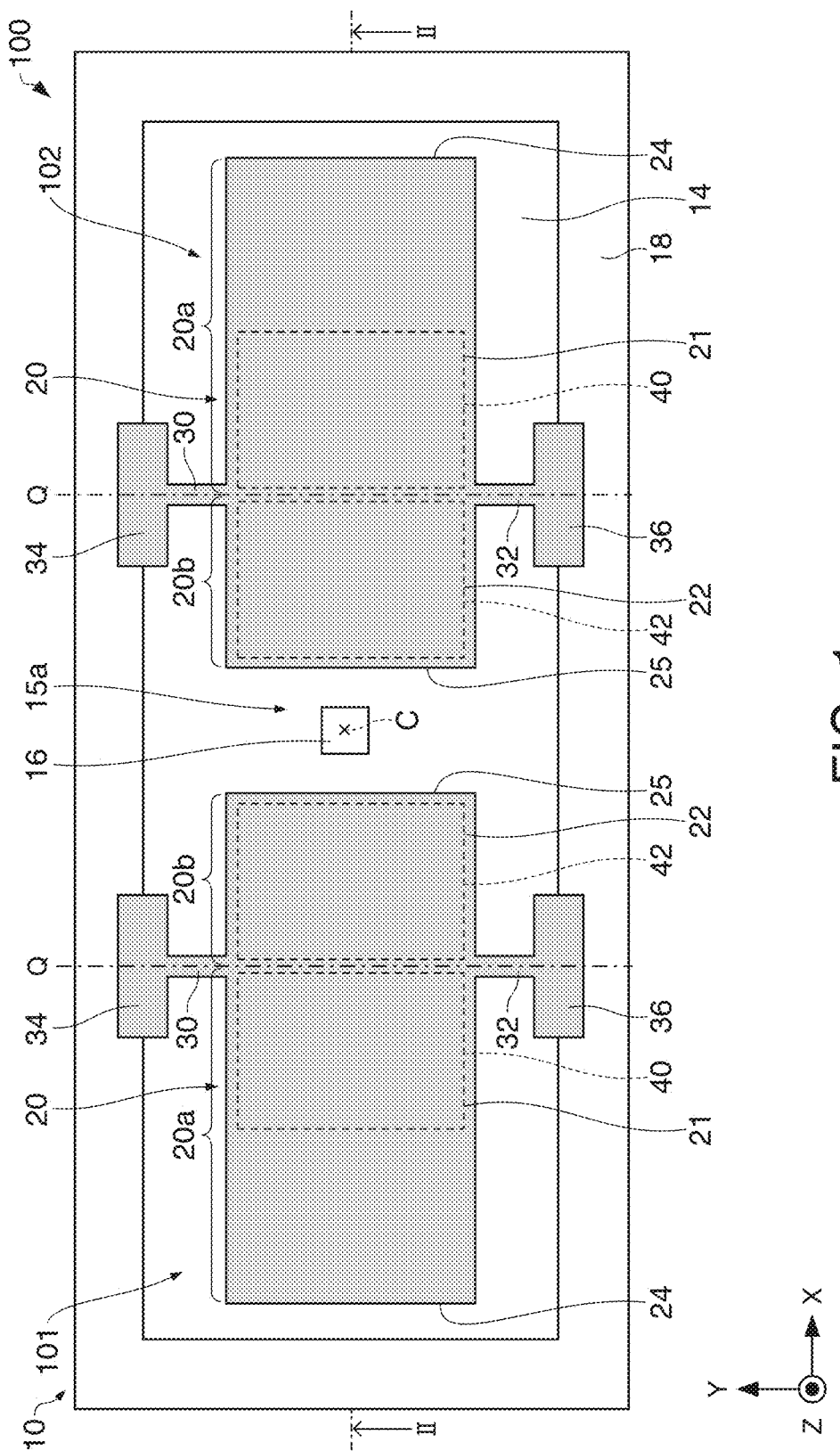
FIG. 1 is a plan view schematically showing a physical quantity sensor according to a first embodiment.
Figure 2:
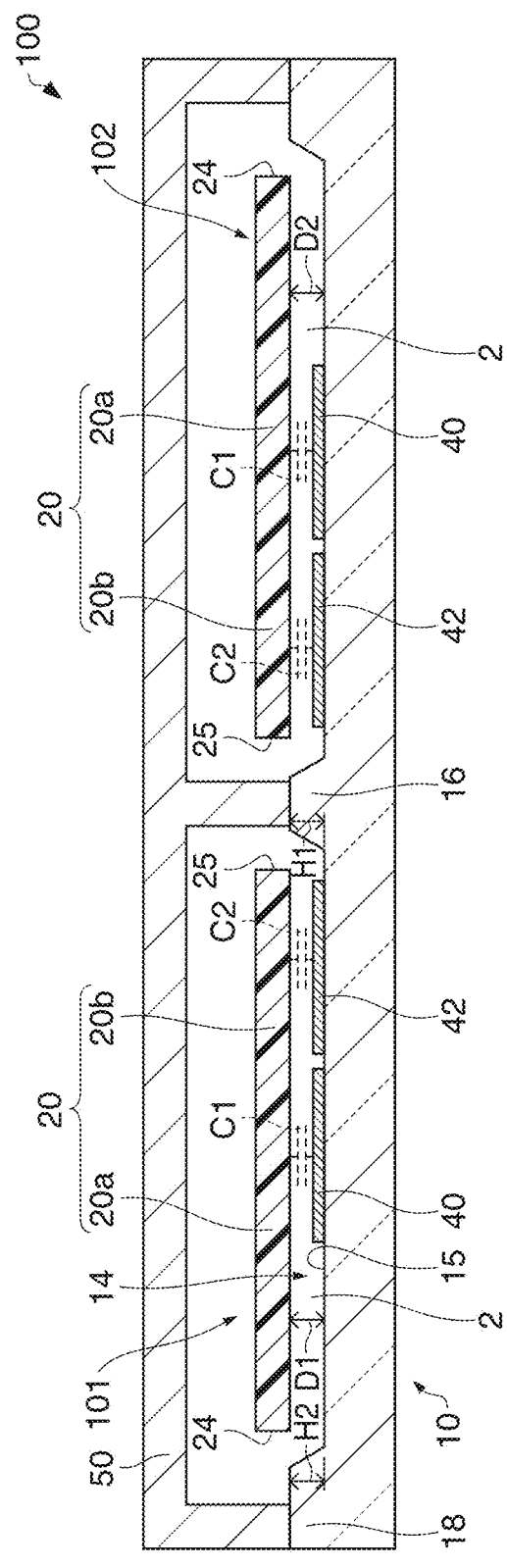
FIG. 2 is a cross-sectional view schematically showing the physical quantity sensor according to the first embodiment.

First, a physical quantity sensor according to a first embodiment will be described with reference to the accompanying drawings. FIG. 1 is a plan view schematically showing a physical quantity sensor 100 according to the first embodiment. FIG. 2 is a cross-sectional view taken along the line II-II of FIG. 1, which schematically shows the physical quantity sensor 100 according to the first embodiment. In addition, for the sake of convenience, a lid 50 is not shown in FIG. 1. In addition, in FIGS. 1 and 2, X, Y, and Z axes are shown as three axes perpendicular to each other.

The physical quantity sensor 100 can be used as an inertial sensor, for example. Specifically, the physical quantity sensor 100 can be used as an acceleration sensor (a capacitive acceleration sensor or a capacitive MEMS acceleration sensor) for measuring the acceleration in a vertical direction (Z-axis direction), for example.

As shown in FIGS. 1 and 2, the physical quantity sensor 100 includes a support substrate (substrate) 10, first and second functional elements 101 and 102, and the lid 50. The first functional element 101 can have a movable body (first movable body) 20, beam sections 30 and 32, fixed sections 34 and 36, and fixed electrode sections (first fixed electrode section) 40 and 42. The second functional element 102 can have a movable body (second movable body) 20, beam sections 30 and 32, fixed sections 34 and 36, and fixed electrode sections (second fixed electrode section) 40 and 42.

As shown in FIG. 1, the first and second functional elements 101 and 102 are arranged along the X axis in plan view (when viewed from the Z-axis direction). The first and second functional elements 101 and 102 are provided symmetrically with respect to the straight line (not shown), which is parallel to the Y axis passing through a center C of the support substrate 10, in plan view.

The planar shape (shape when viewed from the Z-axis direction) of the support substrate 10 is a rectangle, for example. The material of the support substrate 10 is an insulating material, such as glass, for example. For example, by forming the support substrate 10 with an insulating material such as glass and forming the movable body 20 with a semiconductor material such as silicon, the movable body 20 and the support substrate 10 can be easily electrically insulated from each other by bonding the movable body 20 and the support substrate 10 to each other. As a result, the sensor structure can be simplified.

The support substrate 10 includes a post section 16 and a frame section (side wall) 18 protruding from a principal surface 15 of the support substrate 10. A recess 14 is formed by the post section 16 and the frame section 18, and the principal surface 15 is a bottom surface (that is, the bottom surface 15) of the recess 14. In the example shown in FIG. 1, the shape of the outer peripheral edge of the recess 14 is a rectangle.

The post section 16 is provided at a position between the movable body 20 of the first functional element 101 and the movable body 20 of the second functional element 102 in plan view. More specifically, the post section 16 is provided in a portion 15a of the bottom surface 15 of the recess 14 located between the movable body 20 of the first functional element 101 and the movable body 20 of the second functional element 102. The bottom surface 15 is a surface of the support substrate 10 that defines the recess 14. The bottom surface 15 is a flat surface, for example.

The post section 16 protrudes upward from the bottom surface 15 (in a +Z-axis direction). A height (size in the Z-axis direction) H1 of the post section 16 is the same as a size (size in the Z-axis direction) D1 of a gap 2 between the movable body 20 of the first functional element 101 and the bottom surface 15 and a size D2 of the gap 2 between the movable body 20 of the second functional element 102 and the bottom surface 15, for example. The height H1 of the post section 16 is equal to or greater than 1 μm and equal to or less than 2 μm, for example. The side surface of the post section 16 defines the recess 14. In the example shown in FIG. 1, the post section 16 is provided so as to be surrounded by the recess 14. The post section 16 is provided so as to be spaced apart from the frame section 18, for example.

The post section 16 is provided so as to overlap the center of the recess 14 in plan view. In the example shown in FIG. 1, the position of the center of the recess 14 is the same as the position of the center C of the support substrate 10. The center C is located inside the outer edge of the post section 16 in plan view. The post section 16 does not overlap the movable body 20 in plan view. The planar shape of the post section 16 is a rectangle or a square, for example.

The frame section 18 protrudes upward from the bottom surface 15. A height H2 of the frame section 18 is the same as the height H1 of the post section 16, for example. The planar shape of the frame section 18 is a frame shape, for example. The side surface of the frame section 18 defines the recess 14. The frame section 18 is a side wall of the recess 14. In the example shown in FIG. 1, the frame section 18 is provided so as to surround the recess 14.

In addition, although the post section 16 and the frame section 18 are provided as apart of the support substrate 10 in the example shown in the drawings, the post section 16 and the frame section 18 may be formed as separate members from the support substrate 10. That is, the recess 14 may be formed by bonding the post section 16 and the frame section 18 to the plate-shaped support substrate 10.

The fixed electrode sections 40 and 42 are provided on the support substrate 10. In the example shown in the drawings, the fixed electrode sections 40 and 42 are provided on the bottom surface 15. The bottom surface 15 is parallel to the movable body 20 when the movable body 20 is horizontal (parallel to the XY plane). The fixed sections 34 and 36 and the lid 50 are bonded to the support substrate 10. It is possible to form a space for housing the movable body 20 using the support substrate 10 and the lid 50. For example, inert gas, such as nitrogen, helium, and argon, is filled into this space.

The movable body 20 is provided on the support substrate 10 with a gap 2 therebetween. The movable body 20 is supported by the beam sections 30 and 32. The movable body 20 can be displaced with the axis Q as its rotation axis. Specifically, for example, when the acceleration in the vertical direction (Z-axis direction) is applied, seesaw swing of the movable body 20 is possible with the axis Q, which is determined by the beam sections 30 and 32, as a rotation axis (swing axis). The planar shape of the movable body 20 is a rectangle, for example. The thickness of the movable body 20 (size of the movable body 20 in the Z-axis direction) is fixed, for example.

The movable body 20 has first and second seesaw pieces 20a and 20b. The first seesaw piece 20a is one (in the example shown in FIG. 1, a section located on the left side in the first functional element 101 and a section located on the right side in the second functional element 102) of two sections of the movable body 20 divided by the axis Q in plan view. The second seesaw piece 20b is the other one (in the example shown in FIG. 1, a section located on the right side in the first functional element 101 and a section located on the left side in the second functional element 102) of two sections of the movable body 20 divided by the axis Q in plan view.

For example, when the acceleration (for example, acceleration of gravity) in the vertical direction is applied to the movable body 20, rotation moment (moment of force) occurs in each of the first and second seesaw pieces 20a and 20b. Here, when the rotation moment (for example, clockwise rotation moment) of the first seesaw piece 20a and the rotation moment (for example, counterclockwise rotation moment) of the second seesaw piece 20b are balanced, there is no change in the inclination of the movable body 20 and accordingly a change in the acceleration cannot be detected. Therefore, the movable body 20 is designed so that the rotation moment of the first seesaw piece 20a and the rotation moment of the second seesaw piece 20b are not balanced and a predetermined inclination occurs in the movable body 20 when the acceleration in the vertical direction is applied.

In the physical quantity sensor 100, the first and second seesaw pieces 20a and 20b have different mass due to locating the axis Q at a position deviated from the center (center of gravity) of the movable body 20 (by setting the distances from the axis Q to distal ends of the seesaw pieces 20a and 20b differently). That is, the movable body 20 has different mass on one side (first seesaw piece 20a) and the other side (second seesaw piece 20b) with the axis Q as their boundary. In the example shown in the drawings, the distance from the axis Q to an end surface 24 of the first seesaw piece 20a is larger than the distance from the axis Q to an end surface 25 of the second seesaw piece 20b. In addition, the thickness of the first seesaw piece 20a and the thickness of the second seesaw piece 20b are equal. Accordingly, the mass of the first seesaw piece 20a is larger than the mass of the second seesaw piece 20b. Thus, since the mass of the first seesaw piece 20a is different from the mass of the second seesaw piece 20b, the rotation moment of the first seesaw piece 20a and the rotation moment of the second seesaw piece 20b cannot be balanced when the acceleration in the vertical direction is applied. Therefore, when the acceleration in the vertical direction is applied, a predetermined inclination can be caused in the movable body 20.

In addition, although not shown in the drawings, the seesaw pieces 20a and 20b may be made to have different mass by locating the axis Q at the center of the movable body 20 and setting the thicknesses of the seesaw pieces 20a and 20b differently. Also in this case, when the acceleration in the vertical direction is applied, a predetermined inclination can be caused in the movable body 20.

In addition, although not shown in the drawings, a through hole passing through the movable body 20 in the Z-axis direction may be provided in the movable body 20.

The movable body 20 is provided so as to be spaced apart from the support substrate 10. The movable body 20 is provided on the recess 14. In the example shown in the drawings, the gap 2 is provided between the movable body 20 and the support substrate 10. In addition, the movable body 20 is connected to the fixed sections 34 and 36 so as to be spaced apart from the fixed sections 34 and 36 by the beam sections 30 and 32. In this manner, seesaw swing of the movable body 20 is possible.

A movable electrode section 21 is provided in the first seesaw piece 20a. In addition, a movable electrode section 22 is provided in the second seesaw piece 20b.

In the example shown in the drawings, the movable electrode section 21 is a section of the movable body 20 overlapping the fixed electrode section 40 in plan view. The movable electrode section 21 is a section of the movable body 20 that forms a capacitance C1 together with the fixed electrode section 40. The movable electrode section 22 is a section of the movable body 20 overlapping the fixed electrode section 42 in plan view. The second movable electrode section 22 is a section of the movable body 20 that forms a capacitance C2 together with the fixed electrode section 42. In the physical quantity sensor 100, the movable electrode sections 21 and 22 may be provided by forming the movable body 20 with a conductive material, or movable electrode sections formed of a conductor layer, such as metal, may be provided on the surface of the movable body 20. In the example shown in the drawings, the movable electrode sections 21 and 22 are provided by forming the movable body 20 with a conductive material (silicon doped with impurities).

The fixed electrode section 40 is provided at a position of the support substrate 10 facing the movable electrode section 21. The capacitance C1 is formed by the movable electrode section 21 and the fixed electrode section 40. In addition, the fixed electrode section 42 is provided at a position of the support substrate 10 facing the movable electrode section 22. The capacitance C2 is formed by the movable electrode section 22 and the fixed electrode section 42. The capacitance C1 and the capacitance C2 are equal, for example, in an initial state (state where the movable body 20 is horizontal). The positions of the movable electrode sections 21 and 22 change according to the movement of the movable body 20. The capacitance C1 and the capacitance C2 change according to the change in the positions of the movable electrode sections 21 and 22. A predetermined electric potential is applied to the movable body 20 through the beam sections 30 and 32, for example.

In addition, although not shown in the drawings, the fixed electrode section 40 may be provided at a position of the lid 50 facing the movable electrode section 21, and the fixed electrode section 42 may be provided at a position of the lid 50 facing the movable electrode section 22.

The beam sections 30 and 32 support the movable body 20 so that the movable body 20 can be displaced around the axis Q. The beam sections 30 and 32 function as torsion springs. Therefore, since the movable body 20 has a strong restoring force against torsional deformation that occurs in the beam sections 30 and 32 due to seesaw swing of the movable body 20, it is possible to prevent the beam sections 30 and 32 from being damaged.

As shown in FIG. 1, the beam sections 30 and 32 are disposed on the axis Q in plan view. The beam section 30 extends from the fixed section 34 to the movable body 20 on the axis Q. The beam section 32 extends from the fixed section 36 to the movable body 20 on the axis Q. The beam sections 30 and 32 are members that determine the position of the axis Q that becomes the rotation axis (swing axis) of the movable body 20. The beam section 30 connects the fixed section 34 and the movable body 20 to each other. The beam section 32 connects the fixed section 36 and the movable body 20 to each other. The beam section 30 is connected to the side surface of the movable body 20 in the +Y-axis direction, and the second beam section 32 is connected to the side surface of the movable body 20 in the −Y-axis direction.

The fixed sections 34 and 36 are fixed (bonded) to the support substrate 10. More specifically, the fixed sections 34 and 36 are fixed (bonded) to the frame section 18 of the support substrate 10. Each of the fixed sections 34 and 36 and the movable body 20 are spaced apart from each other. Although the planar shape of each of the fixed sections 34 and 36 is not particularly limited, the planar shape is a rectangle in the example shown in FIG. 1.

The movable body 20, the beam sections 30 and 32, and the fixed sections 34 and 36 are integrally provided. The movable body 20, the beam sections 30 and 32, and the fixed sections 34 and 36 are integrally provided by patterning one substrate (for example, a silicon substrate). Materials of the movable body 20, the beam sections 30 and 32, and the fixed sections 34 and 36 are conductive silicon doped with impurities, such as phosphorus or boron, for example.

Although a method of bonding the fixed sections 34 and 36 to the support substrate 10 is not particularly limited, the support substrate 10 and the fixed sections 34 and 36 can be bonded to each other by anodic bonding when the material of the support substrate 10 is glass and the materials of the movable body 20, the beam sections 30 and 32, and the fixed sections 34 and 36 are silicon, for example.

The fixed electrode section 40 is provided on the support substrate 10. The fixed electrode section 40 is disposed so as to face the movable electrode section 21. The movable electrode section 21 is located above the fixed electrode section 40 with the gap 2 therebetween. The fixed electrode section 40 is provided so as to form the capacitance C1 together with the movable electrode section 21.

The fixed electrode section 42 is provided on the support substrate 10. The fixed electrode section 42 is disposed so as to face the movable electrode section 22. The movable electrode section 22 is located above the fixed electrode section 42 with the gap 2 therebetween. The fixed electrode section 42 is provided so as to form the capacitance C2 together with the movable electrode section 22. The area of the fixed electrode section 40 is equal to the area of the fixed electrode section 42. The planar shape of the fixed electrode section 40 and the planar shape of the fixed electrode section 42 are symmetrical with respect to the axis Q, for example.

Materials of the fixed electrode sections 40 and 42 are aluminum, gold, and ITO (Indium Tin Oxide), for example. Preferably, the materials of the fixed electrode sections 40 and 42 are transparent electrode materials, such as ITO. This is because foreign matter or the like present on the fixed electrode sections 40 and 42 can be easily viewed from the opposite side of the bottom surface 15 of the support substrate 10 when the support substrate 10 is a transparent substrate (glass substrate) due to using a transparent electrode material as the fixed electrode sections 40 and 42.

The lid 50 is placed on the support substrate 10. In the example shown in FIG. 2, the lid 50 is bonded to the post section 16 and the frame section 18. The material of the lid 50 is silicon, for example. When the material of the lid 50 is silicon and the material of the support substrate 10 is glass, the support substrate 10 and the lid 50 may be bonded to each other by anodic bonding. The functional elements 101 and 102 can be housed in the lid 50 and the support substrate 10.

Next, the operation of the physical quantity sensor 100 will be described. In the physical quantity sensor 100, the movable body 20 swings (rotates) around the axis Q according to the physical quantity, such as acceleration or angular velocity. The distance between the movable electrode section 21 and the fixed electrode section 40 and the distance between the movable electrode section 22 and the fixed electrode section 42 change with the movement of the movable body 20. Specifically, one of the distance between the electrode sections 21 and 40 and the distance between the electrode sections 22 and 42 is increased, and the other distance is reduced. For this reason, one of the capacitance C1 and the capacitance C2 is increased and the other capacitance is reduced due to the swing (rotation) of the movable body 20. Accordingly, a physical quantity, such as acceleration or angular velocity, can be detected on the basis of the difference between the capacitance C1 and the capacitance C2 (using a so-called differential capacitance detection method).

In addition, in the physical quantity sensor 100, the first and second functional elements 101 and 102 are provided symmetrically with respect to the straight line (not shown) parallel to the Y axis passing through the center C, for example, in plan view. For this reason, error due to having detection sensitivity in a direction (for example, the X-axis direction) other than the detection direction (Z-axis direction) can be eliminated by signal processing. As a result, it is possible to further improve the detection sensitivity in the Z-axis direction.

As described above, the physical quantity sensor 100 can be used as an inertial sensor, such as an acceleration sensor or a gyro sensor. Specifically, the physical quantity sensor 100 can be used as a capacitance acceleration sensor for measuring the acceleration in a vertical direction, for example.

The physical quantity sensor 100 according to the first embodiment has the following features, for example.

According to the physical quantity sensor 100, the post section 16 protruding from the principal surface 15 of the support substrate 10 is provided in a portion of the support substrate 10 located between the movable body 20 of the first functional element 101 and the movable body 20 of the second functional element 102 in plan view. In the physical quantity sensor 100, therefore, when bonding the support substrate 10 and the silicon substrate, which becomes the movable body 20, to each other by anodic bonding, for example, it is possible to suppress the occurrence of a situation where the silicon substrate is pulled to the side of the support substrate 10 and sticks to the support substrate 10 (to the bottom surface 15 of the recess 14). In addition, it is possible to suppress the occurrence of a situation where the silicon substrate is pulled to the side of the support substrate 10 and the silicon substrate is bent, for example. As a result, the physical quantity sensor 100 can be manufactured with a high yield.

Generally, in a physical quantity sensor including two functional elements, a silicon substrate is easily pulled to the support substrate side since the area of a recess (area of the bottom surface) is large. In the physical quantity sensor 100, however, even if the area of the recess 14 (area of the bottom surface 15) is increased due to including the two functional elements 101 and 102, the occurrence of a situation where the silicon substrate is pulled to the side of the support substrate 10 and sticks to the bottom surface 15 of the recess 14 can be suppressed by the post section 16.

According to the physical quantity sensor 100, the height H1 of the post section 16 is the same as the height H2 of the frame section 18 of the recess 14. Therefore, when bonding the support substrate 10 and the silicon substrate, which becomes the movable body 20, to each other by anodic bonding, for example, it is possible to more reliably suppress the occurrence of a situation where the silicon substrate is pulled to the side of the support substrate 10.

According to the physical quantity sensor 100, the lid 50 is bonded to the post section 16. Accordingly, the lid 50 can have high rigidity.

According to the physical quantity sensor 100, the material of the support substrate 10 is glass, and the material of the movable body 20 is silicon. For this reason, the movable body 20 can be formed by processing the silicon substrate, and the silicon substrate for forming the movable body 20 and the support substrate 10 can be bonded to each other by anodic bonding.

According to the physical quantity sensor 100, the post section 16 is provided so as to overlap the center of the recess 14 in plan view. Especially, a portion of the silicon substrate located above the center of the recess is easily pulled to the support substrate side. In the physical quantity sensor 100, however, the occurrence of a situation where the portion of the silicon substrate located above the center of the recess 14 is pulled to the side of the support substrate 10 can be suppressed by the post section 16.

In addition, although not shown in the drawings, the post section 16 may extend in the Y-axis direction, for example, to be connected to the frame section 18, the recess 14 may have first and second recesses with the post section 16 as their boundary, the movable body 20 of the first functional element

101 may be provided on the first recess, and the movable body 20 of the second functional element 102 may be provided on the second recess.

According to the physical quantity sensor 100 having such a configuration, a first recess is provided below the movable body 20 of the first functional element 101 and the second recess is provided below the movable body 20 of the second functional element 102 by providing the post section 16. In this case, air can be confined in the first and second recesses compared with a structure without a post section. As a result, it is possible to improve the damping (viscosity) effect. Specifically, when there is no post section, it is not possible to confine air. In this case, there is a disadvantage in that the movable body comes in contact with a glass substrate easily when excessive acceleration is applied. However, by providing the post section 16, it is possible to confine air in the first and second recesses. As a result, since the damping effect is further increased, it is difficult for the movable body to come in contact with the glass substrate.

1.2. Method of Manufacturing a Physical Quantity Sensor

Figure 3:
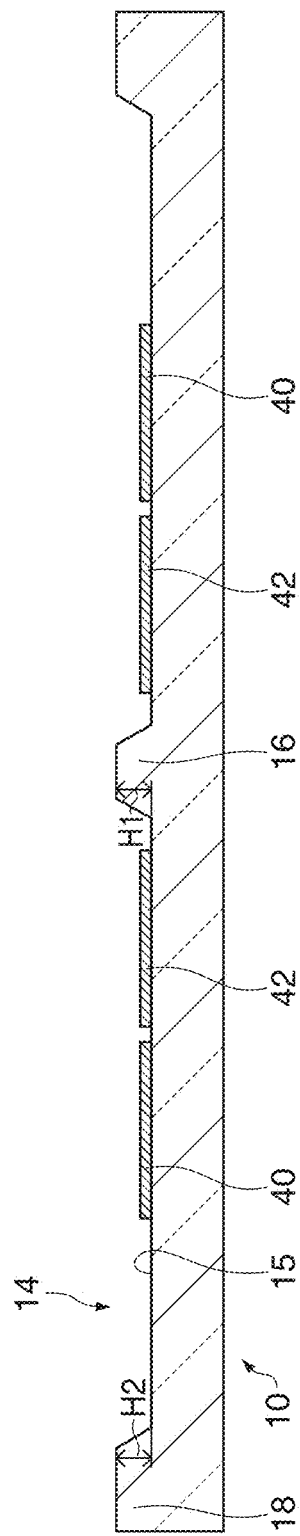
FIG. 3 is a cross-sectional view schematically showing the process of manufacturing the physical quantity sensor according to the first embodiment.
Figure 4:
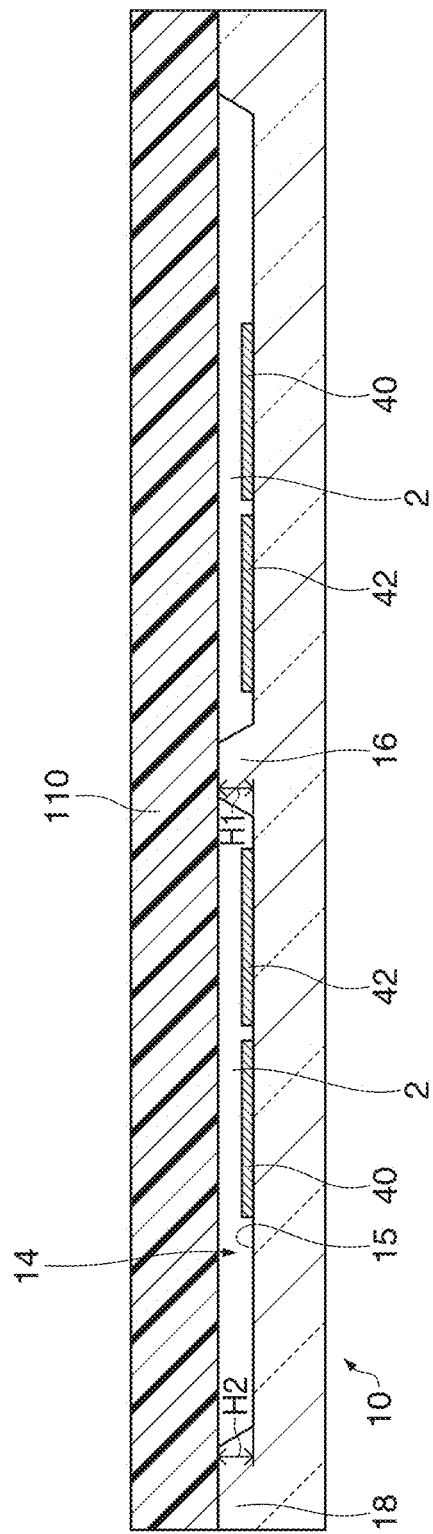
FIG. 4 is a cross-sectional view schematically showing the process of manufacturing the physical quantity sensor according to the first embodiment.
Figure 5:
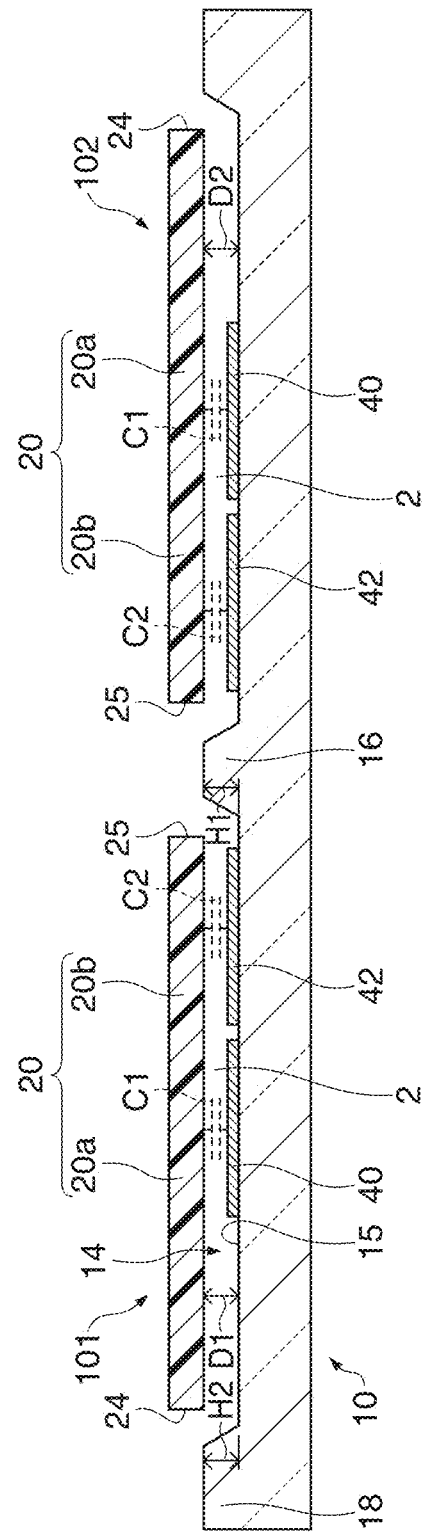
FIG. 5 is a cross-sectional view schematically showing the process of manufacturing the physical quantity sensor according to the first embodiment.

Next, a method of manufacturing the physical quantity sensor according to the first embodiment will be described with reference to the accompanying drawings. FIGS. 3 to 5 are cross-sectional views schematically showing the process of manufacturing the physical quantity sensor 100 according to the first embodiment.

As shown in FIG. 3, for example, a glass substrate is etched to form the recess 14 in the glass substrate, thereby obtaining the support substrate 10 having the post section 16 and the frame section 18. As the etching, for example, wet etching is performed. Through this process, the support substrate (first substrate) 10 in which the recess 14, the post section 16, and the frame section 18 are provided can be prepared.

In addition, although not shown in the drawings, the recess 14 may be formed by forming (bonding) the post section and the frame section 18 on the plate-shaped support substrate 10.

Then, the fixed electrode sections 40 and 42 are formed on the support substrate 10 (on the bottom surface 15 of the recess 14). More specifically, the fixed electrode sections 40 and 42 are formed at a position on the support substrate 10 (bottom surface 15 of the recess 14) facing the movable body 20. The fixed electrode sections 40 and 42 are formed by forming a conductive layer on the bottom surface 15 using a sputtering method or the like and then patterning the conductive layer using a photolithographic technique and an etching technique.

As shown in FIG. 4, a silicon substrate (second substrate) 110 is bonded to the support substrate 10. More specifically, the silicon substrate 110 is bonded onto the post section 16 and the frame section 18 of the support substrate 10. The support substrate 10 and the silicon substrate 110 are bonded to each other by anodic bonding, for example.

As shown in FIG. 5, the movable body 20, the beam sections 30 and 32, and the fixed sections 34 and 36 are formed by making the silicon substrate 110 thin by grinding using a grinding machine, for example, and then patterning (processing) the silicon substrate 110 in a desired shape. More specifically, the movable body 20 of the first functional element 101 is formed on one side (−X-axis direction side) and the movable body 20 of the second functional element 102 is formed on the other side (+X-axis direction side) with the post section 16 as their boundary in plan view (refer to FIG. 1). The movable electrode sections 21 and 22 (refer to FIG. 1) of the movable body 20 are formed so as to face the fixed electrode sections 40 and 42, respectively. Patterning is performed using a photolithographic technique or an etching technique (dry etching). As a more specific etching technique, a Bosch method can be used. In this process, the movable body 20, the beam sections 30 and 32, and the fixed sections 34 and 36 are integrally formed by patterning (etching) the silicon substrate 110. In addition, in this process, for example, the upper surface (surface to which the silicon substrate 110 is bonded) of the post section 16 is exposed.

As shown in FIG. 2, the lid 50 is bonded to the support substrate 10, and the movable body 20 (functional elements 101 and 102) is housed in the space formed by the support substrate 10 and the lid 50. More specifically, the lid 50 is bonded onto the post section 16 and the frame section 18 of the support substrate 10. The support substrate 10 and the lid 50 are bonded to each other using anodic bonding or using an adhesive, for example. By performing this process in an inert gas atmosphere, it is possible to fill inert gas into the space where the movable body 20 is housed.

According to the method of manufacturing the physical quantity sensor 100, the silicon substrate 110 is bonded onto the post section 16 and the frame section 18 of the support substrate 10. Then, the silicon substrate 110 is processed to form the movable body 20 of the first functional element 101 on the −X-axis direction side and the movable body 20 of the second functional element 102 on the +X-axis direction side with the post section 16 as their boundary in plan view. In this manner, when bonding the support substrate 10 and the silicon substrate 110 to each other by anodic bonding, for example, it is possible to suppress the occurrence of a situation where the silicon substrate 110 is pulled to the side of the support substrate 10 and sticks to the support substrate 10 (to the bottom surface 15 of the recess 14). In addition, it is possible to suppress the occurrence of a situation where the silicon substrate is pulled to the side of the support substrate 10 and the silicon substrate is bent, for example. As a result, it is possible to obtain the physical quantity sensor 100 that can be manufactured with a high yield.

2. Second Embodiment

2.1. Physical Quantity Sensor

Figure 6:
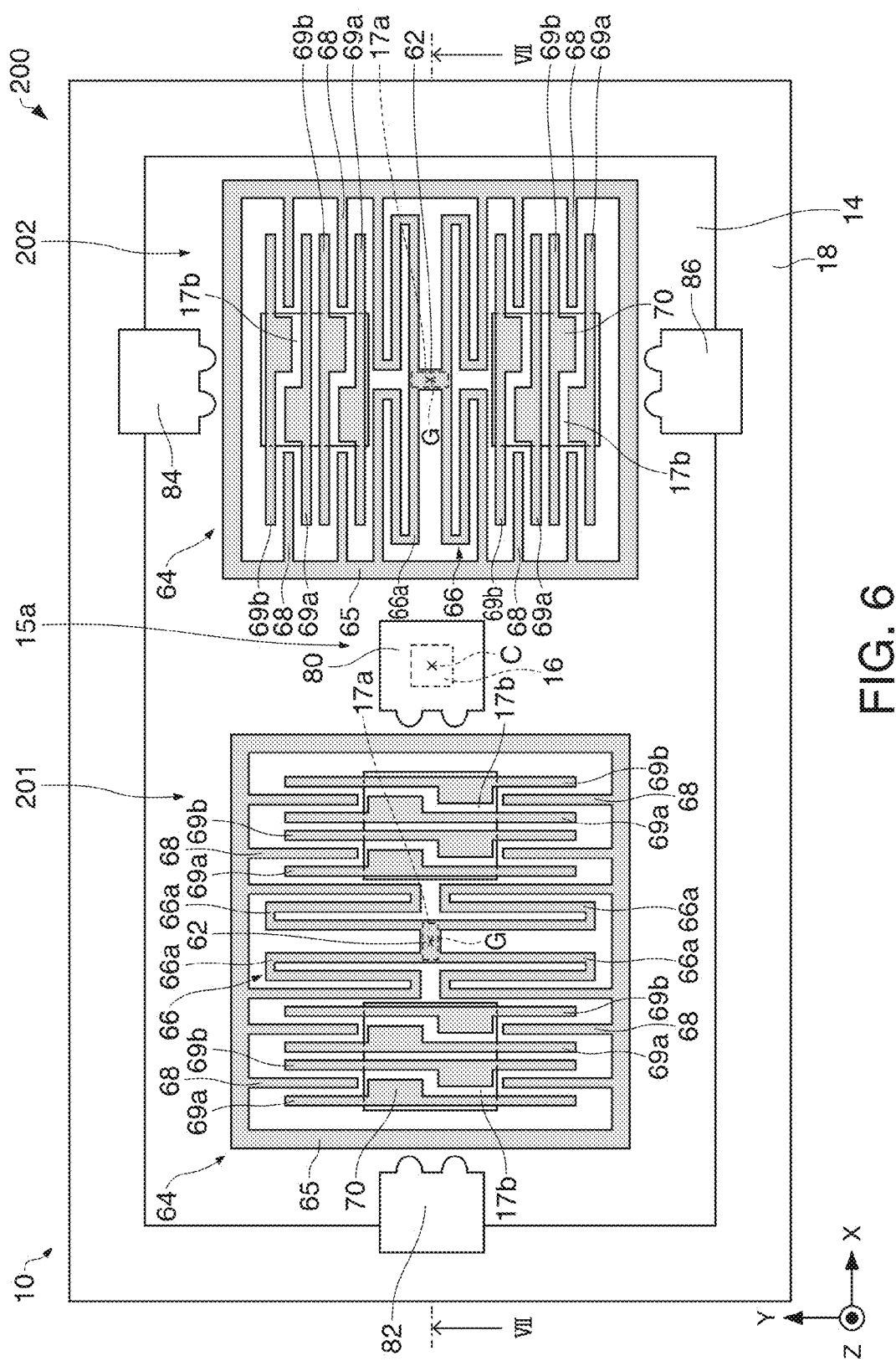
FIG. 6 is a plan view schematically showing a physical quantity sensor according to a second embodiment.
Figure 7:
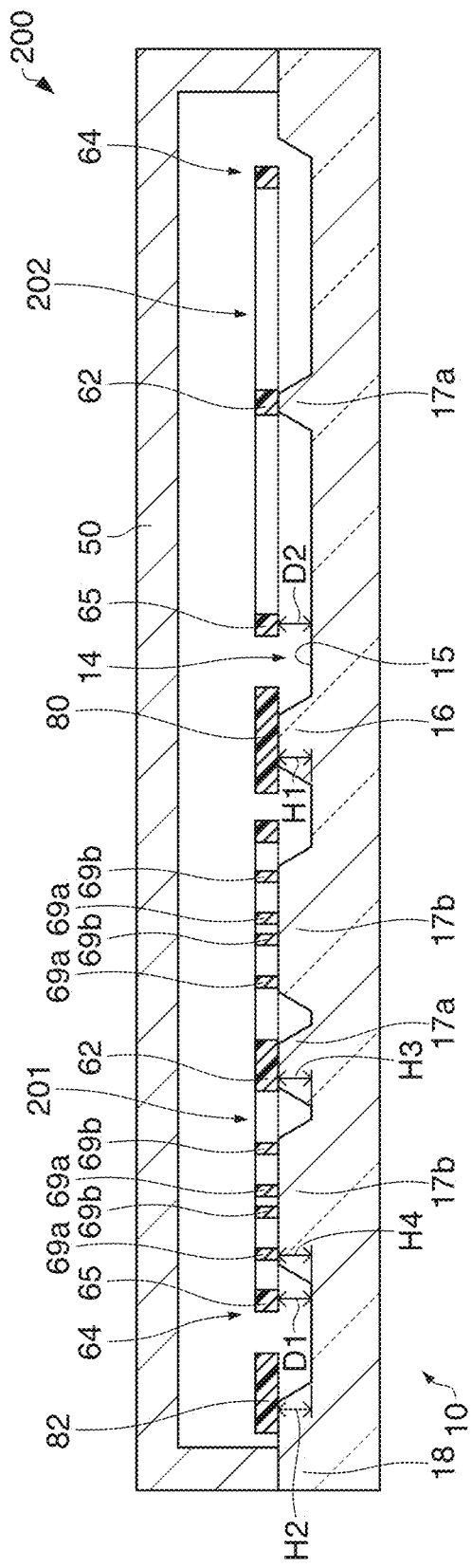
FIG. 7 is a cross-sectional view schematically showing the physical quantity sensor according to the second embodiment.

Next, a physical quantity sensor according to a second embodiment will be described with reference to the accompanying drawings. FIG. 6 is a plan view schematically showing a physical quantity sensor 200 according to the second embodiment. FIG. 7 is a cross-sectional view taken along the line VII-VII of FIG. 6, which schematically shows the physical quantity sensor 200 according to the second embodiment. In addition, for the sake of convenience, the lid 50 is not shown in FIG. 6. In addition, in FIGS. 6 and 7, X, Y, and Z axes are shown as three axes perpendicular to each other.

Hereinafter, in the physical quantity sensor 200 according to the second embodiment, constituent components having the same functions as the constituent components of the physical quantity sensor 100 according to the first embodiment are denoted by the same reference numerals, and detailed explanation thereof will be omitted.

The physical quantity sensor 200 can be used as an inertial sensor, for example. Specifically, the physical quantity sensor 200 can be used as an acceleration sensor (a capacitive acceleration sensor or a capacitive MEMS acceleration sensor) for measuring the acceleration in a horizontal direction (X-axis direction and Y-axis direction), for example.

As shown in FIGS. 6 and 7, the physical quantity sensor 200 includes a support substrate (substrate) 10, first and second functional elements 201 and 202, and the lid 50. The first functional element 201 can have a fixed section 62, a movable body (first movable body) 64, and fixed electrode sections (first fixed electrode section) 69a and 69b. The second functional element 202 can have a fixed section 62, a movable body (second movable body) 64, and fixed electrode sections (second fixed electrode section) 69a and 69b. The movable body 64 can have a support section 65, a spring section 66, and a movable electrode section 68.

In the physical quantity sensor 200, the post section 16 is provided in a portion of the support substrate 10 located between the movable body 20 of the first functional element 201 and the movable body 20 of the second functional element 202 in plan view. More specifically, the post section 16 is provided in a portion 15a of the bottom surface 15 of the recess 14 located between the movable body 20 of the first functional element 201 and the movable body 20 of the second functional element 202 in plan view. The height H1 of the post section 16 is the same as the size D1 of a gap 2 between the movable body 20 of the first functional element 201 and the bottom surface 15 and the size D2 of the gap 2 between the movable body 20 of the second functional element 202 and the bottom surface 15, for example.

The support substrate 10 further includes post sections 17a and 17b. The post sections 17a and 17b protrude upward from the bottom surface 15. A height H3 of the post section 17a and a height H4 of the post section 17b are the same as the height H1 of the post section 16, for example. Side surfaces of the post sections 17a and 17b define the recess 14. In the example shown in FIG. 6, the post sections 17a and 17b are provided so as to be surrounded by the recess 14. The post sections 17a and 17b are provided so as to be spaced apart from the frame section 18, for example.

The post section 17a is a section for supporting the fixed section 62. The post section 17b is a section for supporting the fixed electrode sections 69a and 69b. In the example shown in FIG. 6, the planar shape of each of the post sections 17a and 17b is a rectangle.

The first and second functional elements 201 and 202 are provided on the support substrate 10. As shown in FIG. 6, the first and second functional elements 201 and 202 are arranged along the X axis in plan view. The second functional element 202 has a shape obtained by rotating the first functional element 201 by 90° around the center of gravity G of a structure formed by the fixed section 62 and the movable body 64.

Hereinafter, the first functional element 201 will be described first.

The movable body 64 is provided on the support substrate 10. More specifically, the movable body 64 is provided on the recess 14. The movable body 64 is displaced in the X-axis direction (+X-axis direction or −X-axis direction) according to the acceleration in the X-axis direction. The size of the gap between the movable electrode section 68 and the fixed electrode section 69a and the size of the gap between the movable electrode section 68 and the fixed electrode section 69b change with such displacement. That is, the magnitude of the capacitance between the movable electrode section 68 and the fixed electrode section 69a and the magnitude of the capacitance between the movable electrode section 68 and the fixed electrode section 69b change with the displacement of the movable body 64. On the basis of these capacitance changes, the first functional element 201 (physical quantity sensor 200) can detect the acceleration in the X-axis direction.

The fixed section 62 is fixed (bonded) to the post section 17a of the support substrate 10. In the first functional element 201, the number of fixed sections 62 is 1. As shown in FIG. 6, the fixed section 62 is provided so as to overlap the center of gravity G of the structure, which is formed by the fixed section 62 and the movable body 64, in plan view. The planar shape of the fixed section 62 is a rectangle, for example. In the example shown in FIG. 6, the post section 17a is located inside the outer edge of the fixed section 62. By the fixed section 62, the movable body 64 is supported above the support substrate 10 with a gap therebetween.

As shown in FIG. 6, the support section 65 is provided around the fixed section 62 in plan view. In the example shown in the drawings, the support section 65 is provided so as to surround the fixed section 62. The movable body 64 is supported by the fixed section 62 located inside the support section 65. Therefore, the movable body 64 can be stably supported by one fixed section 62. In this manner, it is possible to suppress the occurrence of a situation where the stress due to being supported by the fixed section 62 is generated in the movable body 64 when the heat is applied, for example. The support section 65 can support the movable electrode section 68. The shape of the support section 65 is a frame shape, for example.

The spring section 66 connects the fixed section 62 and the support section 65 to each other. The spring section 66 can be displaced along the X axis, and is configured to be able to displace the support section 65 in the X-axis direction. In the example shown in FIG. 6, the spring section 66 is formed by four beam sections 66a. The beam section 66a extends in the X-axis direction while reciprocating along the Y axis.

In addition, the number of the beam sections 66a is not particularly limited if the spring section 66 is configured to be able to displace the support section 65 in the X-axis direction.

The movable electrode section 68 is supported by the support section 65. The movable electrode section 68 is connected to the support section 65. The movable electrode section 68 extends from the support section 65 along the Y axis. For example, a plurality of movable electrode sections 68 are provided.

The fixed electrode sections 69a and 69b are fixed (bonded) to the post section 17b of the support substrate 10. The fixed electrode sections 69a and 69b are disposed so as to face the movable electrode section 68. The fixed electrode sections 69a and 69b extend along the Y axis. For example, a plurality of fixed electrode sections 69a and 69b are provided. More specifically, the fixed electrode sections 69a and 69b are alternately disposed along the X axis, and the movable electrode section 68 is disposed between the fixed electrode section 69a and the fixed electrode section 69b. The plurality of fixed electrode sections 69a are electrically connected to each other through wiring lines (not shown). The plurality of fixed electrode sections 69b are electrically connected to each other through wiring lines (not shown).

Each of the fixed electrode sections 69a and 69b has a wide section 70 whose width (size in the X-axis direction) is larger than that of the other section, for example. In the example shown in the drawings, the planar shape of the wide section 70 is a rectangle. Due to the wide section 70, it is possible to increase the contact area between the fixed electrode sections 69a and 69b and the post section 17b. As a result, it is possible to increase the bonding strength between the fixed electrode sections 69a and 69b and the post section 17b.

The fixed section 62 and the movable body 64 are integrally provided. The fixed section 62 and the movable body 64 are integrally provided by patterning one substrate (for example, a silicon substrate). The material of the first functional element 201 (movable body 64) is conductive silicon doped with impurities, such as phosphorus or boron, for example.

Although a method of bonding the fixed section 62 and the fixed electrode sections 69a and 69b to the support substrate 10 is not particularly limited, the support substrate 10 and the first functional element 201 can be bonded to each other by anodic bonding when the material of the support substrate 10 is glass and the material of the first functional element 201 is silicon, for example.

In the physical quantity sensor 200, it is possible to measure the capacitance between the movable electrode section 68 and the fixed electrode section 69a and also to measure the capacitance between the movable electrode section 68 and the fixed electrode section 69b. Thus, in the physical quantity sensor 200, it is possible to measure the capacitance between the movable electrode section 68 and the fixed electrode section 69a and the capacitance between the movable electrode section 68 and the fixed electrode section 69b separately and to detect a physical quantity (acceleration) with high accuracy on the basis of these detection results.

Next, the second functional element 202 will be described.

The second functional element 202 has a shape obtained by rotating the first functional element 201 by 90° around the center of gravity G. The movable body 64 of the second functional element 202 is displaced in the Y-axis direction (+Y-axis direction or −Y-axis direction) according to the acceleration in the Y-axis direction. The size of the gap between the movable electrode section 68 and the fixed electrode section 69a and the size of the gap between the movable electrode section 68 and the fixed electrode section 69b change with such displacement. That is, the magnitude of the capacitance between the movable electrode section 68 and the fixed electrode section 69a and the magnitude of the capacitance between the movable electrode section 68 and the fixed electrode section 69b change with the displacement of the movable body 64. On the basis of these capacitance changes, the second functional element 202 (physical quantity sensor 200) can detect the acceleration in the Y-axis direction.

As described above, the physical quantity sensor 200 can measure the acceleration in the X-axis direction and the acceleration in the Y-axis direction using the first and second functional elements 201 and 202.

As described above, the physical quantity sensor 200 can be used as an inertial sensor, such as an acceleration sensor or a gyro sensor. Specifically, the physical quantity sensor 200 can be used as a capacitance acceleration sensor for measuring the acceleration in a horizontal direction (X-axis direction and Y-axis direction), for example.

The physical quantity sensor 200 may further include stopper sections 80, 82, 84, and 86, as shown in FIGS. 6 and 7.

The stopper sections 80 and 82 are disposed so as to face the movable body 64 of the first functional element 201. In the example shown in FIG. 6, parts of the stopper sections 80 and 82 facing the movable body 64 of the first functional element 201 are curved. The movable body 64 of the first functional element 201 is disposed between the stopper sections 80 and 82 in plan view, as shown in FIG. 6. In the example shown in FIG. 6, the stopper section 80 is disposed on the +X-axis direction side of the movable body 64 of the first functional element 201, and the stopper section 82 is disposed on the −X-axis direction side of the movable body 64 of the first functional element 201. The stopper section 80 is fixed (bonded) to the post section 16. The stopper section 82 is fixed to the frame section 18.

The stopper sections 80 and 82 can suppress the occurrence of a situation where the movable body 64 of the first functional element 201 is displaced in the X-axis direction and the movable electrode section 68 sticks to the fixed electrode sections 69a and 69b.

The stopper sections 84 and 86 are disposed so as to face the movable body 64 of the second functional element 202. In the example shown in FIG. 6, parts of the stopper sections 84 and 86 facing the movable body 64 of the second functional element 202 are curved. The movable body 64 of the second functional element 202 is disposed between the stopper sections 84 and 86 in plan view, as shown in FIG. 6. In the example shown in FIG. 6, the stopper section 84 is disposed on the +Y-axis direction side of the movable body 64 of the second functional element 202, and the stopper section 86 is disposed on the −Y-axis direction side of the movable body 64 of the second functional element 202. The stopper sections 84 and 86 are fixed to the frame section 18. The material of the stopper sections 80, 82, 84, and 86 is the same as the material of the functional elements 201 and 202, for example.

The stopper sections 84 and 86 can suppress the occurrence of a situation where the movable body 64 of the second functional element 202 is displaced in the Y-axis direction and the movable electrode section 68 sticks to the fixed electrode sections 69a and 69b.

In addition, although not shown in the drawings, two post sections 16 may be provided, and the stopper section 80 may be bonded to one of the post sections 16 and the lid 50 may be bonded to the other post section 16.

The physical quantity sensor 200 according to the second embodiment has the following features, for example.

According to the physical quantity sensor 200, the post section 16 protruding from the principal surface 15 of the support substrate 10 is provided in a portion of the support substrate 10 located between the movable body 64 of the first functional element 201 and the movable body 64 of the second functional element 202 in plan view. In the physical quantity sensor 200, therefore, when bonding the support substrate 10 and the silicon substrate, which becomes the movable body 20, to each other by anodic bonding, for example, it is possible to suppress the occurrence of a situation where the silicon substrate is pulled to the side of the support substrate 10 and sticks to the support substrate 10 (to the bottom surface 15 of the recess 14). In addition, it is possible to suppress the occurrence of a situation where the silicon substrate is pulled to the side of the support substrate 10 and the silicon substrate is bent, for example. As a result, the physical quantity sensor 200 can be manufactured with a high yield.

The physical quantity sensor 200 can include the stopper section 80 bonded to the post section 16. Therefore, it is possible to suppress the occurrence of a situation where the movable electrode section 68 and the fixed electrode sections 69a and 69b of the first functional element 201 stick to each other, for example.

2.2 Method of Manufacturing a Physical Quantity Sensor

Figure 8:
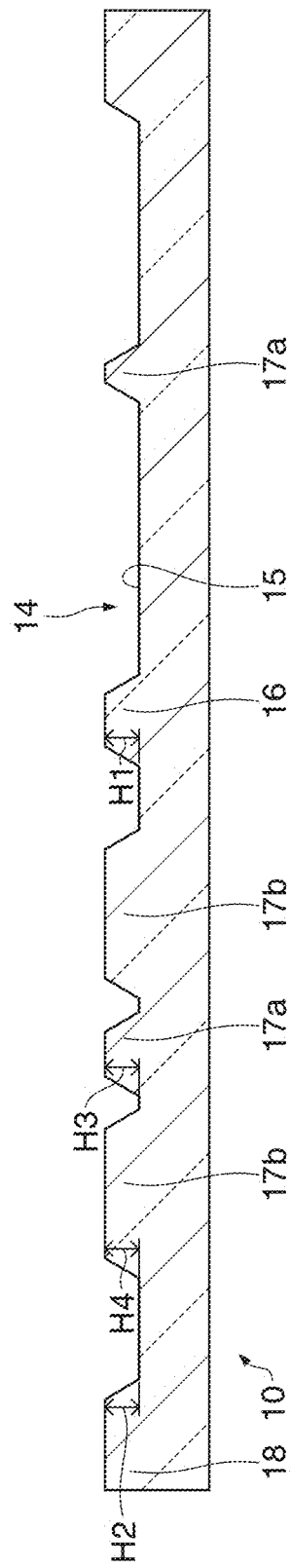
FIG. 8 is a cross-sectional view schematically showing the process of manufacturing the physical quantity sensor according to the second embodiment.
Figure 9:
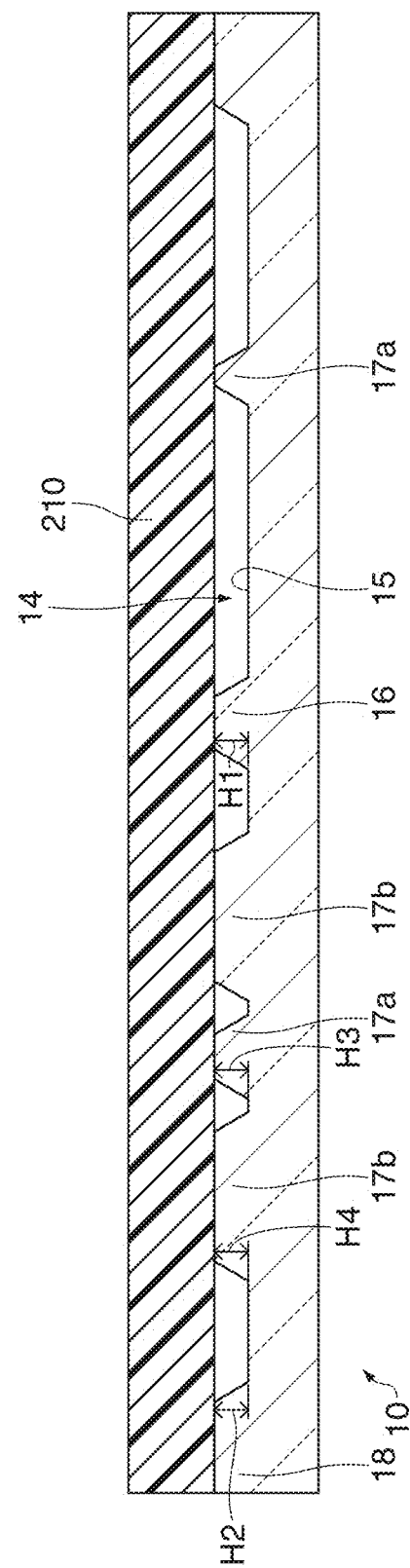
FIG. 9 is a cross-sectional view schematically showing the process of manufacturing the physical quantity sensor according to the second embodiment.
Figure 10:
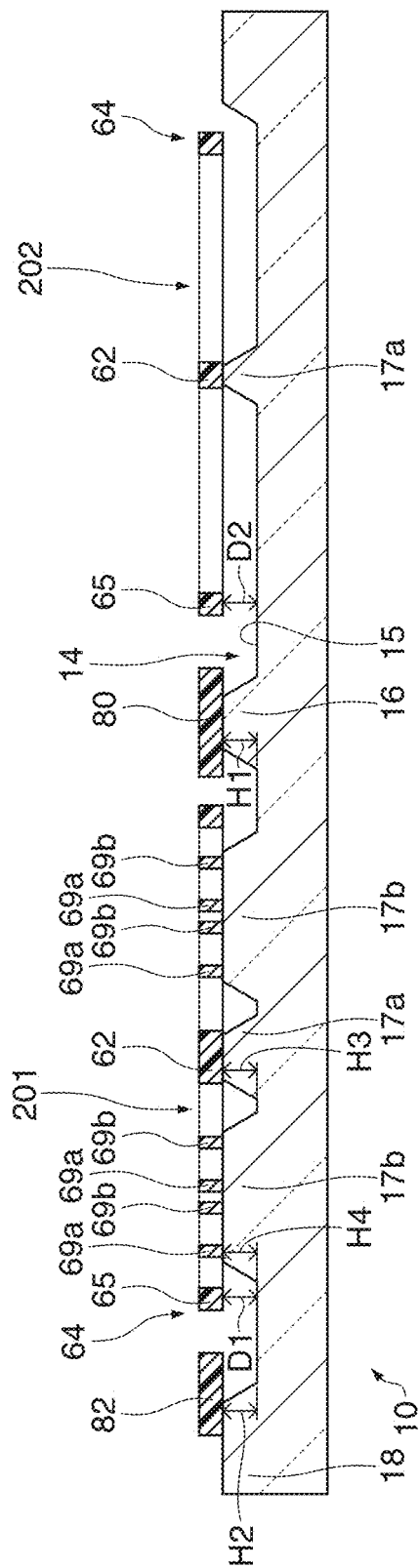
FIG. 10 is a cross-sectional view schematically showing the process of manufacturing the physical quantity sensor according to the second embodiment.

Next, a method of manufacturing the physical quantity sensor according to the second embodiment will be described with reference to the accompanying drawings. FIGS. 8 to 10 are cross-sectional views schematically showing the process of manufacturing the physical quantity sensor 200 according to the second embodiment.

As shown in FIG. 8, for example, a glass substrate is etched to form the recess 14 in the glass substrate, thereby obtaining the support substrate 10 having the post sections 16, 17a, and 17b and the frame section 18. As the etching, for example, wet etching is performed. Through this process, the support substrate (first substrate) 10 in which the recess 14, the post sections 16, 17a, and 17b, and the frame section 18 are provided can be prepared.

In addition, although not shown in the drawings, the recess 14 may be formed by forming (bonding) the post section and the frame section 18 on the plate-shaped support substrate 10.

As shown in FIG. 9, a silicon substrate (second substrate) 210 is bonded to the support substrate 10. More specifically, the silicon substrate 210 is bonded onto the post sections 16, 17a, and 17b and the frame section 18 of the support substrate 10. The support substrate 10 and the silicon substrate 210 are bonded to each other by anodic bonding, for example.

As shown in FIG. 10, the fixed section 62, the movable body 64, the fixed electrodes 69a and 69b, and the stopper sections 80, 82, 84, and 86 are formed by making the silicon substrate 210 thin by grinding using a grinding machine, for example, and then patterning (processing) the silicon substrate 210 in a desired shape. More specifically, the movable body 20 of the first functional element 201 is formed on one side (−X-axis direction side) and the movable body 20 of the second functional element 202 is formed on the other side (+X-axis direction side) with the post section 16 as their boundary in plan view (refer to FIG. 6). The movable body 64 and the fixed electrode sections 69a and 69b are formed so as to face each other. Patterning is performed using a photolithographic technique or an etching technique (dry etching). As a more specific etching technique, a Bosch method can be used. In this process, the fixed section 62 and the movable body 64 are integrally formed by patterning (etching) the silicon substrate 210.

As shown in FIG. 7, the lid 50 is bonded to the support substrate 10, and the movable body 64 (functional elements 201 and 202) is housed in the space formed by the support substrate 10 and the lid 50. More specifically, the lid 50 is bonded onto the frame section 18 of the support substrate 10. The support substrate 10 and the lid 50 are bonded to each other using anodic bonding or using an adhesive, for example. By performing this process in an inert gas atmosphere, it is possible to fill inert gas in the space where the movable body 64 is housed.

According to the method of manufacturing the physical quantity sensor 200, the silicon substrate 210 is bonded to the post section 16 of the support substrate 10. Then, the silicon substrate 210 is processed to form the movable body 64 of the first functional element 201 on the −X-axis direction side and the movable body 64 of the second functional element 202 on the +X-axis direction side with the post section 16 as their boundary in plan view. In this manner, when bonding the support substrate 10 and the silicon substrate 210 to each other by anodic bonding, for example, it is possible to suppress the occurrence of a situation where the silicon substrate 210 is pulled to the side of the support substrate 10 and sticks to the support substrate 10 (to the bottom surface 15 of the recess 14). In addition, it is possible to suppress the occurrence of a situation where the silicon substrate is pulled to the side of the support substrate 10 and the silicon substrate is bent, for example. As a result, it is possible to obtain the physical quantity sensor 200 that can be manufactured with a high yield.

3. Third Embodiment

Next, an electronic apparatus according to a third embodiment will be described with reference to the accompanying drawings. The electronic apparatus according to the third embodiment includes the physical quantity sensor according to the embodiment of the invention. Hereinafter, an electronic apparatus including the physical quantity sensor 100 as the physical quantity sensor according to the embodiment of the invention will be described.

Figure 11:
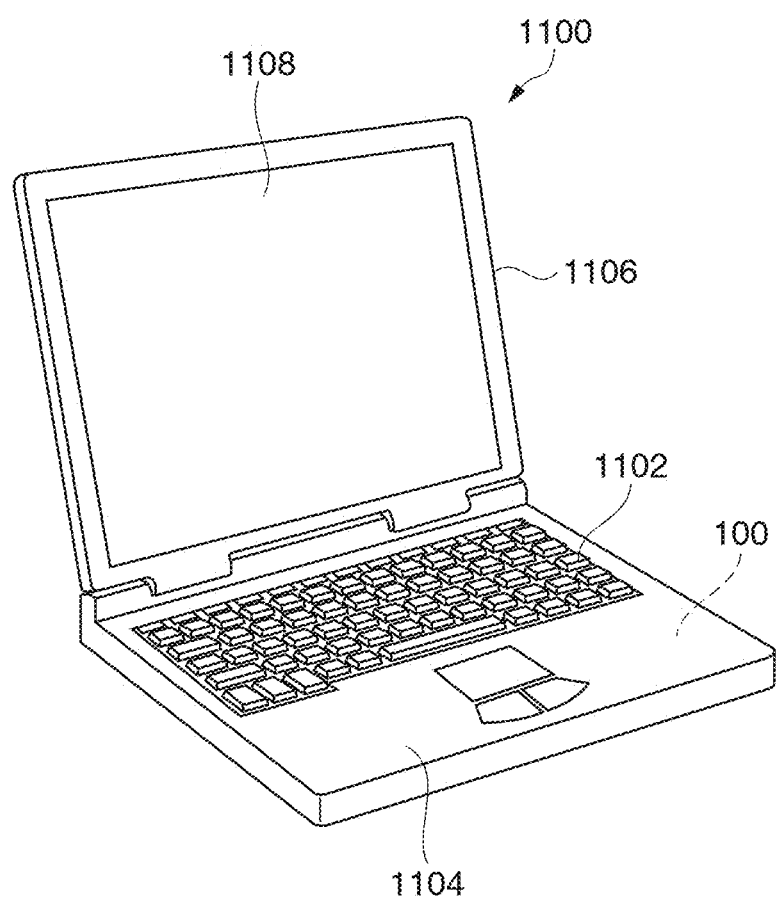
FIG. 11 is a perspective view schematically showing an electronic apparatus according to a third embodiment.

FIG. 11 is a perspective view schematically showing a mobile (or notebook) personal computer 1100 as the electronic apparatus according to the third embodiment.

As shown in FIG. 11, the personal computer 1100 is configured to include a main body 1104 having a keyboard 1102 and a display unit 1106 having a display section 1108, and the display unit 1106 is supported so as to be rotatable with respect to the main body 1104 through a hinge structure.

The physical quantity sensor 100 is built in such a personal computer 1100.

Figure 12:
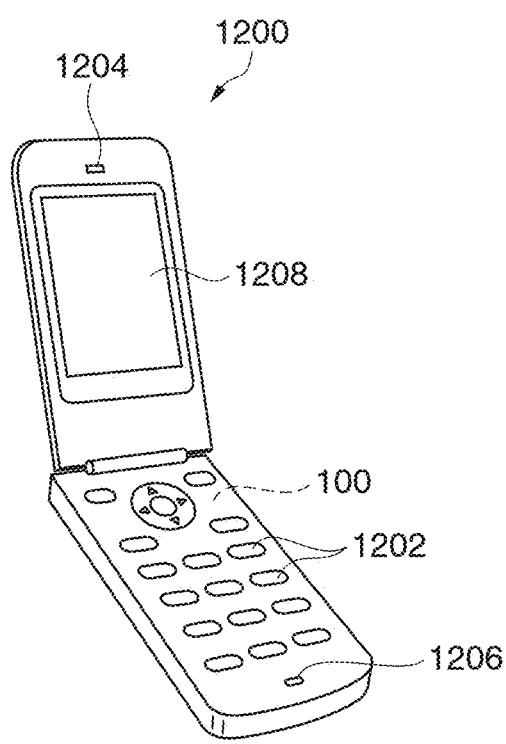
FIG. 12 is a perspective view schematically showing the electronic apparatus according to the third embodiment.

FIG. 12 is a perspective view schematically showing a mobile phone (including a PHS) 1200 as the electronic apparatus according to the third embodiment.

As shown in FIG. 12, the mobile phone 1200 includes a plurality of operation buttons 1202, an earpiece 1204, and a speaker 1206, and a display unit 1208 is disposed between the operation buttons 1202 and the earpiece 1204.

The physical quantity sensor 100 is built in such a mobile phone 1200.

Figure 13:
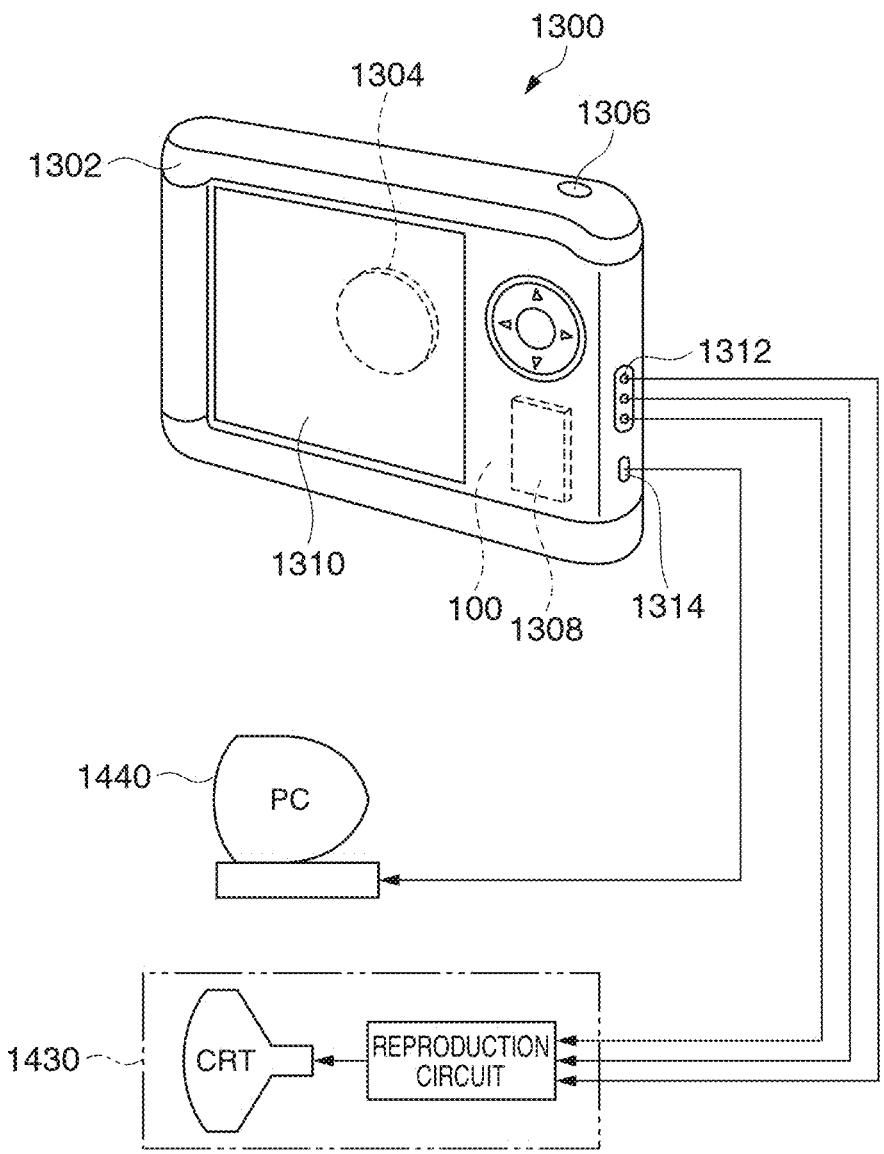
FIG. 13 is a perspective view schematically showing the electronic apparatus according to the third embodiment.

FIG. 13 is a perspective view schematically showing a digital still camera 1300 as the electronic apparatus according to the third embodiment. In addition, FIG. 13 also simply shows a connection with an external apparatus.

Here, while a silver halide photograph film is exposed to light according to an optical image of a subject in a typical camera, the digital still camera 1300 generates an imaging signal (image signal) by performing photoelectric conversion of an optical image of a subject using an imaging element, such as a CCD (Charge Coupled Device).

A display unit 1310 is provided on the back of a case (body) 1302 in the digital still camera 1300, so that display based on the imaging signal of the CCD is performed. The display unit 1310 functions as a viewfinder that displays a subject as an electronic image.

In addition, a light receiving unit 1304 including an optical lens (imaging optical system), a CCD, and the like is provided on the front side (back side in the drawing) of the case 1302.

When a photographer checks a subject image displayed on the display unit 1310 and presses a shutter button 1306, an imaging signal of the CCD at that time is transferred and stored in a memory 1308.

In addition, in this digital still camera 1300, a video signal output terminal 1312 and an input and output terminal for data communication 1314 are provided on the side of the case 1302. In addition, a television monitor 1430 is connected to the video signal output terminal 1312 and a personal computer 1440 is connected to the input and output terminal for data communication 1314 when necessary. In addition, an imaging signal stored in the memory 1308 may be output to the television monitor 1430 or the personal computer 1440 through a predetermined operation.

The physical quantity sensor 100 is provided in such a digital still camera 1300.

Since each of the above electronic apparatuses 1100, 1200, and 1300 includes the physical quantity sensor 100, it is possible to have a high yield.

In addition, examples of the electronic apparatus including the above-described physical quantity sensor 100 include not only the personal computer (mobile personal computer) shown in FIG. 11, the mobile phone shown in FIG. 12, and the digital still camera shown in FIG. 13 but also an ink jet type discharge apparatus (for example, an ink jet printer), a laptop type personal computer, a television, a video camera, a video tape recorder, various navigation apparatuses, a pager, an electronic diary (electronic diary with a communication function is also included), an electronic dictionary, an electronic calculator, an electronic game machine, a word processor, a workstation, a video phone, a television monitor for security, electronic binoculars, a POS terminal, medical equipment (for example, an electronic thermometer, a sphygmomanometer, a blood sugar meter, an electrocardiographic measurement device, an ultrasonic diagnostic apparatus, and an electronic endoscope), a fish detector, various measurement apparatuses, instruments (for example, instruments for vehicles, aircraft, robots, and ships), posture control of a robot, a human body, and the like, and a flight simulator.

The invention includes substantially the same configuration (for example, a configuration with the same function, method, and result or a configuration with the same object and effect) as the configuration described in the embodiment. In addition, the invention includes a configuration that replaces a section that is not essential in the configuration described in the embodiment. In addition, the invention includes a configuration capable of achieving the same operation and effect as in the configuration described in the embodiment or a configuration capable of achieving the same object. In addition, the invention includes a configuration in which a known technique is added to the configuration described in the embodiment.

The entire disclosure of Japanese Patent Application No. 2012-089275, filed Apr. 10, 2012 is expressly incorporated by reference herein.

What is claimed is:

1. A physical quantity sensor comprising:
    a substrate comprising a principal surface;
    a first movable body that is provided above the principal surface of the substrate and includes a first movable electrode section, the first movable body having first top and bottom surfaces;
    a first fixed electrode section disposed on the principal surface of the substrate so as to face the first movable electrode section;
    a second movable body that is provided above the principal surface of the substrate and includes a second movable electrode section, the second movable body having second top and bottom surfaces;
    a second fixed electrode section disposed on the principal surface of the substrate so as to face the second movable electrode section;
    a post section that protrudes from the principal surface of the substrate and that is located between the first and second movable bodies in a plan view, the post section having a third top surface; and
    a post stopper section that is bonded to the third top surface of the post section, wherein
    the first bottom surface, the second bottom surface and the third top surface are located on the same plane,
    the principle surface extend in a first direction, and
    the post stopper section is disposed so as to face at least one of side surfaces of the first and second movable bodies in the first direction.

2. The physical quantity sensor according to claim 1,
    wherein a recess comprising a side wall and an inner bottom is provided in the substrate, and
    the principal surface is the inner bottom of the recess.

3. The physical quantity sensor according to claim 2,
    wherein a height of the post section is the same as a height of the side wall of the recess.

4. The physical quantity sensor according to claim 2, further comprising:
    a side stopper section that is bonded to the side wall of the recess and that is disposed so as to face at least one of the first and second movable bodies.

5. The physical quantity sensor according to claim 1, further comprising:
    a recess having a side wall and an inner bottom, the recess being provided in the substrate; and
    a side stopper section that is bonded to the side wall of the recess and that is disposed so as to face at least one of the first and second movable bodies.

6. The physical quantity sensor according to claim 1,
    wherein a material of the substrate is glass, and
    a material of each of the first and second movable bodies is silicon.

7. A mobile phone comprising:
    the physical quantity sensor according to claim 1; and
    a display that displays an image, wherein
    the physical quantity sensor detects acceleration of the mobile phone when the mobile phone moves.

8. A method of manufacturing a physical quantity sensor, comprising:
    preparing a first substrate in which a recess and a post section protruding from a bottom surface of the recess are provided, the post section having a post top surface;
    bonding a second substrate on the post top surface and a side wall of the recess of the first substrate; and
    processing the second substrate to form a post stopper section on the post top surface, a first movable body on one side and a second movable body on the other side so that the post stopper section is located between the first and second movable bodies in a plan view, wherein
    the first movable body has first top and bottom surfaces, and the second movable body has second top and bottom surfaces,
    the first bottom surface, the second bottom surface and the post top surface are located on the same plane,
    the bottom surface of the recess extends in a first direction, and
    the post stopper section is disposed so as to face at least one of side surfaces at the first and second movable bodies in the first direction.

9. The method of manufacturing a physical quantity sensor according to claim 8, further comprising:
    forming a first fixed electrode section at a position on the bottom surface of the recess facing the first movable body and forming a second fixed electrode section at a position on the bottom surface of the recess facing the second movable body.

* * * * *